United States Patent
Chao

(10) Patent No.: US 8,435,359 B2
(45) Date of Patent: May 7, 2013

(54) CLEANER AND PATH CONTROLLING METHOD THEREOF

(76) Inventor: Chi-Mou Chao, Hsinchu County (TW)

( * ) Notice: Subject to any disclaimer, the term of this patent is extended or adjusted under 35 U.S.C. 154(b) by 357 days.

(21) Appl. No.: 12/832,074

(22) Filed: Jul. 8, 2010

(65) Prior Publication Data

US 2011/0308547 A1   Dec. 22, 2011

(30) Foreign Application Priority Data

Jun. 17, 2010  (TW) .............................. 99119672 A

(51) Int. Cl.
    *B08B 3/00*  (2006.01)
(52) U.S. Cl.
    USPC ................ 134/56 R; 134/57 R; 134/58 R
(58) Field of Classification Search .................. None
    See application file for complete search history.

(56) References Cited

U.S. PATENT DOCUMENTS 1,921,479 A * 8/1933 Pierce ........................... 134/126
3,656,491 A * 4/1972 Ballard ....................... 134/56 R

* cited by examiner

*Primary Examiner* — Eric Golightly
(74) *Attorney, Agent, or Firm* — Muncy, Geissler, Olds & Lowe, PLLC

(57) ABSTRACT

A cleaner adapted to clean particles on a plate is provided. The cleaner includes an active driver and a slave driver. The active driver includes a plurality of active cleaning wheels and a control system. Each of the active cleaning wheels includes a first magnet, and the first magnet has an even number of magnetic poles. The control system is electronically connected with the active cleaning wheels so as to control a rotation of the active cleaning wheels. The slave driver includes a plurality of slave cleaning wheels. Each of the slave cleaning wheels includes a second magnet, and the second magnet has an even number of magnetic poles. The plate is disposed between the active driver and the slave driver. The second magnets are disposed opposite to the first magnets, so that the active cleaning wheels drive the slave cleaning wheels to rotate by a magnetic force.

22 Claims, 7 Drawing Sheets

CLEANER AND PATH CONTROLLING METHOD THEREOF

CROSS-REFERENCE TO RELATED APPLICATION

This application claims the priority benefit of Taiwan application serial no. 99119672, filed on Jun. 17, 2010. The entirety of the above-mentioned patent application is hereby incorporated by reference herein and made a part of this specification.

BACKGROUND

1. Field of the Invention

The invention relates to a cleaner. More particularly, the invention relates to a cleaner adapted to clean a plate.

2. Description of Related Art

According to a conventional cleaning method of residential doors/windows, the doors/windows are generally opened or detached for cleaning, and regarding exterior doors/windows of a building, a hanging rack is generally erected outside the building, and a motor is used to control ascending and descending of the hanging rack, and then the exterior doors/windows of the building are cleaned through bushes or waterspout. However, the hanging rack is easy to be blown by wind and swung due to its unstable center of gravity. To avoid excessive force exerted on the doors/windows to cause slip of operators or falling of cleaning equipments that causes hazard to people below, the doors/windows can only be roughly flushed, so that the doors/windows cannot be totally washed clean.

SUMMARY

The invention is directed to a cleaner, which is adapted to clean particles on a plate.

The invention is directed to a cleaner, which is adapted to clean particles on a magnetic conductive plate.

The invention is directed to a path controlling method of a cleaner, which is adapted to the aforementioned cleaner.

The invention provides a cleaner, which is adapted to clean particles on a plate. The cleaner includes an active driver and a slave driver. The active driver includes a plurality of active cleaning wheels and a control system. Each of the active cleaning wheels includes a first magnet, and the first magnet has an even number of magnetic poles. The control system is electrically coupled to the active cleaning wheels so as to control a rotation of the active cleaning wheels. The slave driver includes a plurality of slave cleaning wheels. Each of the slave cleaning wheels includes a second magnet, and the second magnet has an even number of magnetic poles. The plate is disposed between the active driver and the slave driver. The second magnets are disposed opposite to the first magnets, so that the active cleaning wheels drive the slave cleaning wheels to rotate by a magnetic force.

In an embodiment of the invention, the cleaner further includes an active driver casing and a safety lug. The safety lug is disposed on the active driver casing.

In an embodiment of the invention, the cleaner further includes an active driver casing and a water spray device. The water spray device is disposed on the active driver casing, and is adapted to spray liquid to edges of the active cleaning wheels.

In an embodiment of the invention, the cleaner further includes an active driver casing and an edge sensor. The edge sensor is disposed on the active driver casing, and is electrically connected to the control system, and senses whether the cleaner is close to an edge of the plate.

In an embodiment of the invention, the edge sensor is an infrared sensor, an ultrasonic sensor or a laser sensor.

In an embodiment of the invention, the cleaner further includes an active driver casing and a digital sensor. The digital sensor is disposed on the active driver casing, and is electrically connected to the control system, and senses whether the cleaner is close to a frame of the plate or a foreign matter.

In an embodiment of the invention, the digital sensor is a limit switch or a proximity switch.

In an embodiment of the invention, the control system includes a processing system and a driving device. The processing system outputs a control signal. The driving device outputs a plurality of first driving signals according to the control signal. The cleaner further includes a plurality of cleaning motors, which are correspondingly connected to the active cleaning wheels for respectively controlling the rotation of the active cleaning wheels according to the first driving signals.

In an embodiment of the invention, the driving device includes a pulse width modulation (PWM) unit and a plurality of first driving units. The PWM unit outputs a plurality of first PWM signals according to the control signal. The first driving units correspondingly output the first driving signals according to the first PWM signals, so as to respectively control the rotation of the active cleaning wheels.

In an embodiment of the invention, the PWM unit further outputs a plurality of second PWM signals according to the control signal. The driving device further outputs a plurality of second driving signals according to the second PWM signals. Moreover, the cleaner further includes a plurality of magnet motors. The magnet motors are connected to the first magnets, and respectively adjust magnetic forces of the first magnets exerted on the plate according to the second driving signals.

In an embodiment of the invention, the cleaner further includes a magnetic force sensor. The magnetic force sensor senses a magnitude of the magnetic force, and accordingly outputs a sensing signal to the control system. The control system outputs the second driving signals according to the sensing signal.

In an embodiment of the invention, the cleaner further includes a magnet motor speed reducer and a displacement mechanism. The displacement mechanism is connected to the magnet motor speed reducer and at least one of the first magnets, and adjusts a position of at least one of the first magnets relative to the plate or changes a reluctance of at least one of the first magnets according to a magnitude of the magnetic force.

In an embodiment of the invention, the first magnet is a fixed magnet.

In an embodiment of the invention, the cleaner further includes a conductive slip ring. The conductive slip ring is electrically connected to a power signal line in the active cleaning wheels.

In an embodiment of the invention, the cleaner further includes a slave driver casing and a safety lug. The safety lug is disposed on the slave driver casing.

In an embodiment of the invention, the cleaner further includes a slave driver casing and a water spray device. The water spray device is disposed on the slave driver casing, and is adapted to spray liquid to edges of the slave cleaning wheels.

In an embodiment of the invention, the second magnet is a fixed magnet.

In an embodiment of the invention, the active cleaning wheels and the slave cleaning wheels respectively have a cleaning material.

In an embodiment of the invention, the cleaner further includes a level sensor. The level sensor senses a level angle of the cleaner. The control system adjusts a moving path of the cleaner according to the level angle.

In an embodiment of the invention, the level sensor is a gyroscope or a gradienter.

In an embodiment of the invention, the cleaner further includes a remote control receiver. The remote control receiver receives a remote control signal. The control system controls a moving path of the cleaner according to the remote control signal.

In an embodiment of the invention, the remote control signal is sent by a remote control transmitter.

In an embodiment of the invention, the plate is a non-magnetic conductive plate.

The invention provides a cleaner adapted to clean particles on a magnetic conductive plate. The cleaner includes an active driver. The active driver includes a plurality of active cleaning wheels and a control system. Each of the active cleaning wheels includes a first magnet, wherein the active driver is attracted to the magnetic conductive plate through the first magnets. The control system is electrically coupled to the active cleaning wheels for controlling a rotation of the active cleaning wheels.

Moreover, the invention provides a path controlling method of a cleaner, which is adapted to a cleaner. The cleaner includes a first active cleaning wheel, a second active cleaning wheel and a connecting rod arm connected to the first cleaning wheel and the second cleaning wheel. The path controlling method includes following steps. First, the first active cleaning wheel is fixed still. Then, the second active cleaning wheel is rotated along a first rotation direction, so that a first torque force is generated between the second active cleaning wheel and the connecting rod arm. Then, the connecting rod arm is swung along a second rotation direction opposite to the first rotation direction by the first torque force.

In an embodiment of the invention, the path controlling method of the cleaner further includes exerting a second torque force between the first active cleaning wheel and the connecting rod arm.

In an embodiment of the invention, the path controlling method of the cleaner further includes following steps. First, the second active cleaning wheel is fixed still. Then, the first active cleaning wheel is rotated along the second rotation direction, so that a second torque force is generated between the first active cleaning wheel and the connecting rod arm. Then, the connecting rod arm is swung along the first rotation direction opposite to the second rotation direction by the second torque force, so as to propel the cleaner along a first direction.

In an embodiment of the invention, the first rotation direction is a clockwise direction, and the second rotation direction is an anticlockwise direction.

In an embodiment of the invention, a moving path of the cleaner is sequentially along the first direction, a second direction and a third direction, wherein the first direction and the third direction are substantially parallel and reversed, and the second direction is substantially perpendicular to the first direction and the third direction.

In an embodiment of the invention, a moving path of the cleaner on a plate has a spiral shape, and the cleaner is moved from periphery of the plate to a center of the plate.

According to the above descriptions, in the cleaner of the invention, the active driver and the slave driver are respectively attracted to two opposite sides of the plate by magnetic attraction between the active driver and the slave driver, so that both sides of the plate are able to be cleaned. Moreover, in the cleaner of the invention, the active driver is adapted to be directly attracted to the magnetic conductive plate by the magnetic force, which also achieves an effect of cleaning the magnetic conductive plate.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

First Embodiment

Figure 1:
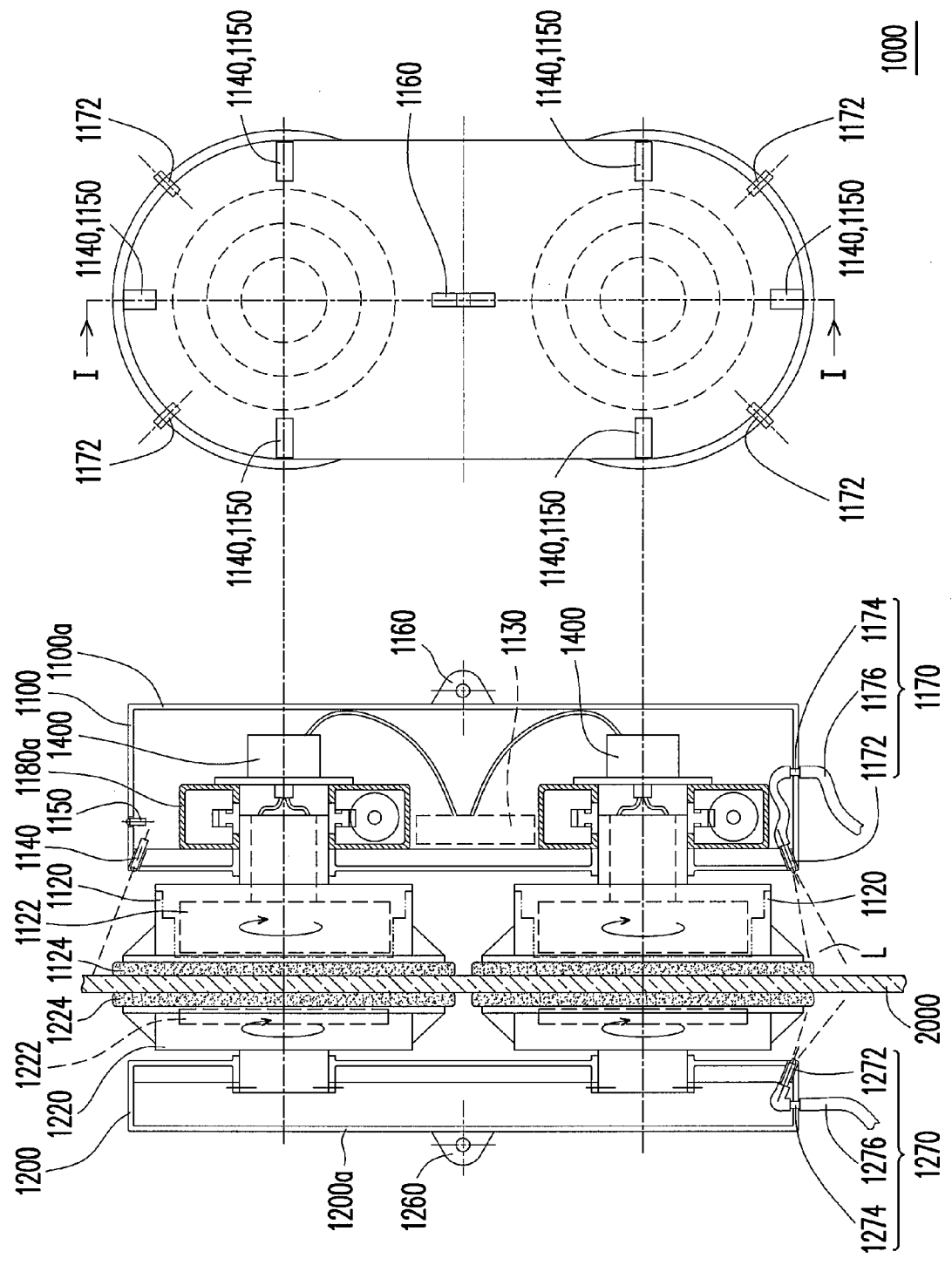
FIG. 1 is a schematic diagram illustrating a cleaner according to a first embodiment of the invention.

FIG. 1 is a schematic diagram illustrating a cleaner according to a first embodiment of the invention, in which a right diagram is a cross-sectional view of a left diagram along a section line I-I. The cleaner 1000 of the present embodiment is adapted to clean particles on a plate 2000, wherein the plate 2000 is, for example, a piece of glass or a non-magnetic conductive plate. Referring to FIG. 1, the cleaner 1000 includes an active driver 1100 and a slave driver 1200. The active driver 1100 includes a plurality of active cleaning wheels 1120 and a control system 1130, wherein the control system 1130 may include a circuit board. Each of the active cleaning wheels 1120 includes a first magnet 1122, and the first magnet 1122 has an even number of magnetic poles. The control system 1130 is electrically coupled to the active cleaning wheels 1120, so as to control a rotation of the active cleaning wheels 1120.

The slave driver 1200 includes a plurality of slave cleaning wheels 1220. Each of the slave cleaning wheels 1220 includes a second magnet 1222, and the second magnet 1222 has an even number of magnetic poles. As shown in FIG. 1, the plate 2000 is disposed between the active driver 1100 and the slave driver 1200, and the second magnets 1122 are disposed opposite to the first magnets 1122, so that the active cleaning wheels 1120 can drive the slave cleaning wheels 1220 to rotate through a magnetic force. Namely, the active driver 1100 and the slave driver 1200 are respectively disposed at two opposite sides of the plate 2000.

In detail, the active driver 1100 and the slave driver 1200, for example, respectively have two cleaning wheels (i.e. the active cleaning wheels 1120 and the slave cleaning wheels 1220). The first magnets 1122 in the cleaning wheels 1120 of the active driver 1100 and the second magnets 1122 in the slave driver 1200 that are separated by the plate 2000 are mutually attracted by the magnetic force, so as to keep the cleaner 1000 not to drop. Besides, since the first magnet 1122 and the second magnet 1222 respectively have even number of the magnetic poles, the active cleaning wheels 1120 of the active driver 1100 can drive the slave cleaning wheels 1220 of the slave driver 1200 to simultaneously rotate through the magnetic force, so as to achieve an effect of cleaning both sides of the plate 2000.

On the other hand, the active cleaning wheels 1120 and the slave cleaning wheels 1220 respectively have cleaning materials 1124 and 1224. The cleaning materials 1124 and 1224 may have a plate shape, and a material thereof is, for example, sponge, cloth, cotton, wool or paper. Moreover, the cleaner 1100 further includes a cleaning wheel motor speed reducer 1180a, and the cleaning wheel motor speed reducer 1180a is used to drive the active cleaning wheel 1100 to rotate. Besides, the cleaner 1000 further includes a conductive slip ring 1400, which is electrically connected to a power signal line (not shown) in the active cleaning wheel 1120. A control power of the control system 1130 can be transmitted to the first magnet 1122 in the rotated active cleaning wheel 1100 through the conductive slip ring 1400. Meanwhile, a sensing signal in the active cleaning wheel 1120 can be transmitted back to the control system 1130 through the conductive slip ring 1400.

Moreover, the cleaner 1000 of the present embodiment further includes an active driver casing 1100a, an edge sensor 1140 and a digital sensor 1150. The edge sensor 1140 is disposed on the active driver casing 1100a, and is electrically connected to the control system 1130. The edge sensor 1140 senses whether the cleaner 1000 is close to an edge of the plate 2000, wherein the plate 2000 is, for example, a piece of glass or a door/window. In detail, the edge sensor 1140, for example, faces to a surface of the glass or the door/window, and senses an edge of the glass or a door/window frame. Moreover, the edge sensor 1140 can be a light reflective device, which is, for example, an infrared sensor, an ultrasonic sensor or a laser sensor. For example, in case the plate 2000 is a piece of glass, and the edge of the plate 2000 has a door/window frame, when the cleaner 1000 approaches the door/window frame, the edge sensor 1140 may sense a relatively intense reflection signal reflected by the door/window frame. On the other hand, in case that the plate 2000 is a piece of glass, and the edge of the plate 2000 does not have the door/window frame, when the cleaner 1000 approaches the edge, the edge sensor 1140 cannot sense the reflection signal reflected by the plate 2000. Therefore, it avails determining a position of the cleaner 1000 by using the edge sensor 1140 disposed on the active driver casing 1100a.

The digital sensor 1150 is disposed on the active driver casing 1100a, and is electrically connected to the control system 1130. The digital sensor 1150 is adapted to sense whether the cleaner 1000 is close to a frame of the plate 2000 or a foreign matter. In detail, the digital sensor 1150 is adapted to emit a detecting signal vertically towards the door/window frame, so as to detect the door/window frame or the foreign matter. In the present embodiment, the digital sensor 1150 can be a light reflective device, a limit switch or a proximity switch. In the present embodiment, numbers of the edge sensor 1140 and the digital sensor 1150 are plural (only six sensors are schematically illustrated), and the sensors are distributed at peripheral of the active driver 1100. However, in other embodiments, the numbers of the edge sensor 1140 and the digital sensor 1150 are not limited to the number defined in the present embodiment. Moreover, the control system 1130 may receive all of the sensing signals and drive the two active cleaning wheels 1120, or control the first magnets 1122 in the active cleaning wheels 1120.

Referring to FIG. 1 again, the cleaner 1100 further includes a safety lug 1160 and a water spray device 1170. The safety lug 1160 is disposed on the active driver casing 1100a for binding a safety rope (not shown). For example, another end of the safety rope can be fastened on the building to prevent falling of the cleaner 1000. The water spray device 1170 is disposed on the active driver casing 1100a, and is adapted to spray liquid L to edges of the active cleaning wheels 1120, wherein the liquid L is for example, spray water. In the present embodiment, the water spray device 1170 includes a nozzle 1172, a pipe fitting 1174 and an external small pipe 1176. As shown in FIG. 1, the external small pipe 1176 is connected to the pipe fitting 1174, and is further connected to the nozzle 1172 for spraying water to the edges of the cleaning materials 1124. Moreover, a number of the nozzles 1172 is plural (four nozzles are schematically illustrated in FIG. 1), and the nozzles 1172 are distributed at peripheral of the active cleaning wheels 1120 to facilitate spraying the liquid L to the edges of the active cleaning wheels 1120. However, in other embodiments, the number of the nozzle 1172 can also be one, which is not limited to the number defined in the present embodiment.

On the other hand, the slave driver 1200 of the present embodiment includes two slave cleaning wheels 1122. The second magnets 1222 of the slave cleaning wheels 1122 are, for example, fixed magnets. The slave cleaning wheels 1220 are driven by the magnetic force of the active driver 1100, and also have cleaning materials 1224. Similarly, the slave driver 1200 also includes a slave driver casing 1200a, a safety lug 1260 and a water spray device 1270. The safety lug 1260 and the water spray device 1270 are all disposed on the slave driver casing 1200a. The safety lug 1260 is used for binding a safety rope (not shown), and another end of the safety rope can be fastened on the building to prevent falling of the cleaner 1000.

The water spray device 1270 includes a nozzle 1272, a pipe fitting 1274 and an external small pipe 1276. The external small pipe 1276 is connected to the pipe fitting 1274, and is further connected to the nozzle 1272 for spraying the liquid L to the edges of the cleaning materials 1224. Moreover, a number of the nozzles 1272 is, for example, four, and the nozzles 1172 are distributed at peripheral of the slave cleaning wheels 1220 to facilitate spraying the liquid L to the edges of the slave cleaning wheels 1220.

Figure 2:
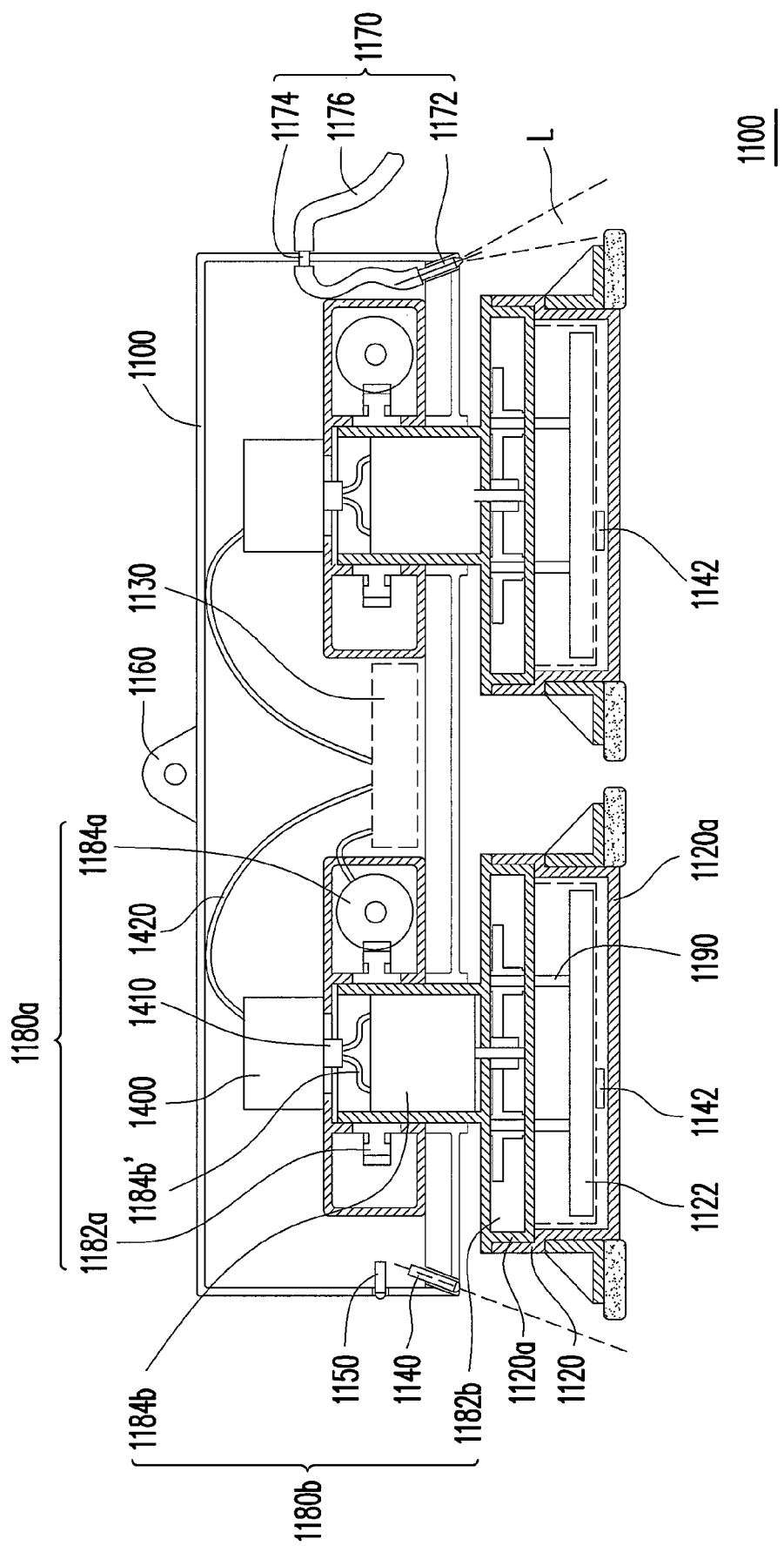
FIG. 2 is another cross-sectional view of an active driver 1100 of FIG. 1 along a section line I-I.

FIG. 2 is another cross-sectional view of the active driver 1100 of FIG. 1 along a section line I-I. As shown in FIG. 2, the active driver 1100 of the present embodiment further includes the cleaning wheel motor speed reducers 1180a, and the active cleaning wheels 1120 are driven by the cleaning wheel motor speed reducers 1180a. The cleaning wheel motor speed reducer 1180a includes a gear set 1182a and a cleaning motor 1184a. In the present embodiment, each cleaning wheel motor speed reducer 1180a corresponds to one cleaning motor 1184a.

Besides, the active driver 1100 of the present embodiment further includes a displacement mechanism 1190, and a magnet motor speed reducer 1180b further includes a gear set 1182b and a magnet motor 1184b. The displacement mechanism 1190 is connected to the magnet motor speed reducer 1180b and at least one of the first magnets 1122. The displacement mechanism 1190 is, for example, a screw rod, which can adjust a position of the first magnet 1122 relative to the plate 2000 of FIG. 1, or changes a reluctance of the first magnet 1122 according to a current magnitude of the magnetic force.

In detail, the gear set 1182b is connected to the displacement mechanism 1190. The magnet motor 1184b is connected to the gear set 1182b and is electrically connected to the control system 1130. The magnet motor 1184b is adapted to drive the displacement mechanism 1190 to adjust a position of at least one of the first magnets 1122 relative to the plate 2000 of FIG. 1, or change a reluctance of at least one of the first magnets 1122. In other words, the magnet motor 1184b of the present embodiment drives the magnet motor speed reducer 1180b, so as to drive the displacement mechanism 1190 for adjusting the position of the first magnet 1122 relative to the plate 2000 of FIG. 1. Besides, the active driver 1100 further includes a magnetic force sensor 1142, which is, for example, a hall sensor. The magnetic force sensor 1142 is fixed on a body 1120a of the active cleaning wheel 1120 for sensing a magnitude of the magnetic force, so that the magnet motor speed reducer 1180b can adjust the position of the first magnet 1122 relative to the plate 2000 of FIG. 1 according to the magnitude of the magnetic force. According to the above descriptions, it is known that the cleaner 1000 of the present embodiment can be a magnetic force controllable cleaner.

In addition, a casing of the conductive slip ring 1400 is fixed on a casing of the cleaning motor speed reducer 1180a. The conductive slip ring 1400 includes a rotor 1410 connected to the active cleaning wheel 1120. An electric wire 1184b' of the magnet motor 1184b and a signal wire (not shown) of the magnetic force sensor 1142 are connected to external through the conductive slip ring 1400, and are connected to the control system 1130 through an electric wire 1420.

It should be noticed that in other embodiments, the magnetic force sensor 1142 and the magnet motor speed reducer 1180b of the active driver 1100 can be omitted. Namely, in the other embodiments, the position of the first magnet 1122 relative to the plate 2000 is not adjusted according to the current magnitude of the magnetic force. Namely, in the other embodiments, the first magnet 1122 and the second magnet 1222 can be fixed magnets.

Figure 3A:
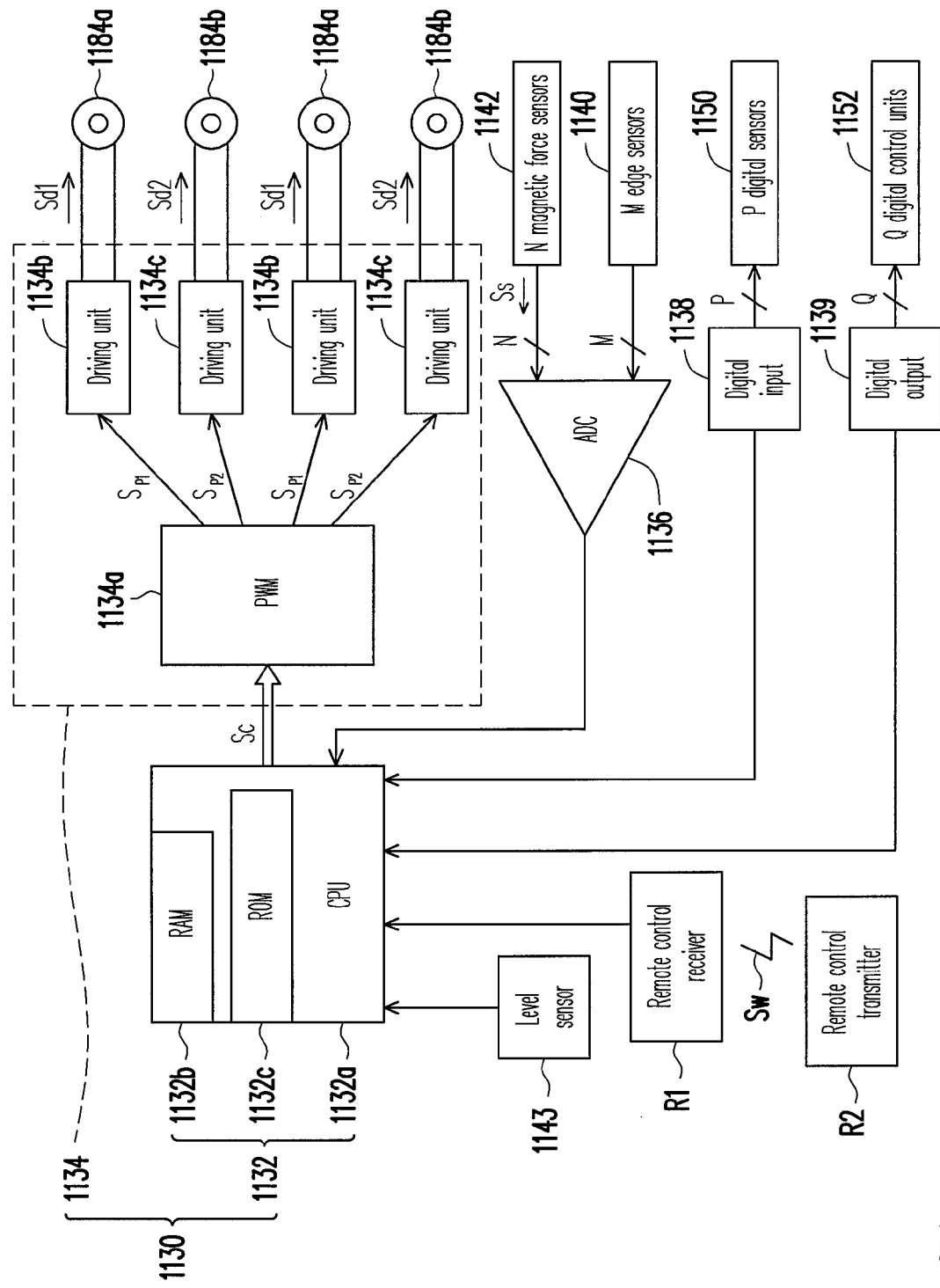
FIG. 3A is a block diagram of a cleaner 1000 of FIG. 1.

FIG. 3A is a block diagram of the cleaner 1000 of FIG. 1. Referring to FIG. 1 to FIG. 3A, the control system 1130 includes a processing system 1132 and a driving device 1134. The processing system 1132 outputs a control signal Sc. The driving device 1134 outputs a plurality of driving signals Sd1 according to the control signal Sc. The cleaning motors 1184a in the cleaner 1000 are correspondingly connected to the active cleaning wheels 1120 for respectively controlling the rotation of the active cleaning wheels 1120 according to the driving signal Sd1. In detail, the driving device 1134 includes a pulse width modulation (PWM) unit 1134a and a plurality of driving unit 1134b. The PWM unit 1134a outputs a plurality of PWM signals $S_{P1}$ according to the control signal Sc. The driving units 1134b correspondingly output the driving signals Sd1 to the cleaning motors 1184a according to the PWM signals $S_{P1}$, so as to respectively control the rotation of the active cleaning wheels 1120.

Moreover, the PWM unit 1134a further outputs a plurality of PWM signals $S_{P2}$ according to the control signal Sc. The driving device 1134 further outputs a plurality of driving signals Sd2 according to the PWM signals $S_{P2}$, so that the magnet motors 1184b connected to the first magnets 1122 respectively adjust the magnetic force of the first magnet 1122 exerted to the plate 2000 according to the driving signals Sd2. For example, the driving device 1134 uses a plurality of driving units 1134c to receive the PWM signals $S_{P2}$, so as to output the driving signals Sd2 to the magnet motors 1184b.

In other words, the PWM unit 1134a and the driving units 1134b and 1134c of the present embodiment is a module used for controlling driving forces of the cleaning motors 1184a and the magnet motors 1184b. Further, the cleaning motors 1184a and the magnet motors 1184b respectively control rotations of the active cleaning wheels 1120 and magnetic attractions of the first magnets 1122 to the plate 2000.

On the other hand, the processing system 1132 of the present embodiment may include a central processing unit (CPU) 1132a, a random access memory (RAM) 1132b and a read only memory (ROM) 1132c. The CPU 1132a, the RAM 1132b and the ROM 1132c serve as a basic module of a microcomputer for computation and storage, wherein the ROM 1132c can be a flash memory, and program codes can be stored in the ROM 1132c.

As shown in FIG. 2 and FIG. 3A, the magnetic force sensor 1142 is disposed at a front end of the first magnet 1122 in the active cleaning wheel 1120 for sensing a magnitude of the magnetic force, and accordingly outputting a sensing signal Ss to the control system 1130. The control system 1130 outputs the driving signal Sd2 according to the sensing signal Ss. In detail, the processing system 1132 reads the sensing signal Ss of the magnetic force sensor 1142 through an analog-to-digital converter (ADC) 1136, and achieves a closed-loop magnetic force control in collaboration with the magnet motor 1184b, so as to control the magnitude of the magnetic force of the first magnet 1122.

Figure 3B:
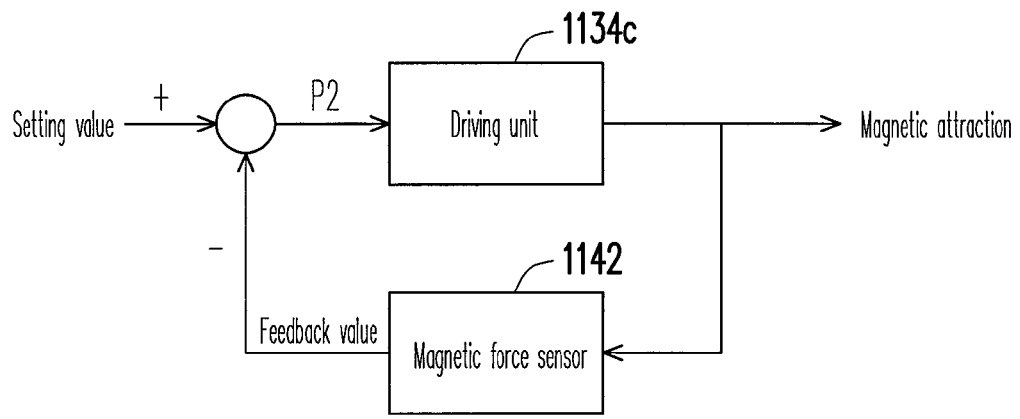
FIG. 3B is a block diagram illustrating a closed-loop control method of a cleaner 1000.

FIG. 3B is a block diagram illustrating a closed-loop control method of the cleaner 1000, wherein N, M, P and Q are integers greater than 0. Referring to FIG. 3A and FIG. 3B, after a negative feedback operation of the processing system 1132 of the present embodiment, the PWM signals $S_{p2}$ are sent to the driving units 1134c for driving the magnet motors 1184b, wherein a feedback value shown in FIG. 3B is the sensing signal Ss of FIG. 3A. Then, the gear set 1182b of FIG. 2 controls a space between the first magnet 1122 and the plate 2000, or controls the magnitude of the reluctance of the first magnet 1122. According to a feedback control theory, the feedback value of the magnetic force sensor 1142 influences adjustment of a setting value, so as to control the magnetic attraction. Moreover, by using the above method, the processing system 1132 can also determine whether the cleaner 1000 has a falling risk according to the current magnitude of the magnetic force, so as to take corresponding protection measures.

It should be noticed that in other embodiments, the cleaner 1000 can also control the space between the first magnet 1122 and the plate 2000 of FIG. 1 according to an open-loop control method. For example, by using a stepping motor and controlling a step number of the stepping motor, the above space and the magnitude of reluctance can be adjusted, so as to achieve an effect of controlling a magnitude of the magnetic force.

Referring to FIG. 3A again, on the other hand, the cleaner 100 can use the edge sensor 1140 to detect an edge of a door/window. The edge sensor 1140 can be an analog sensor, which is, for example, a distance sensor such as an infrared sensor, a laser sensor or an ultrasonic sensor, etc. The control system 1130 can read a sensing value of the edge sensor 1140 through the ADC 1136, and accordingly determines the distance between the cleaner 1000 and the edge of the plate 2000.

In detail, if the plate 2000 is a piece of glass without a door/window frame, and when the sensing value is smaller than a lower threshold, it represents that the sensing signal reflected by the glass is not received at the moment, i.e. the cleaner 1000 is close to the edge of the glass at the moment. On the other hand, if the plate 2000 is a piece of glass having the door/window frame, and when the sensing value is greater than a upper threshold, it represents that the cleaner 1000 is close to the door/window frame, so that a relatively intense reflected sensing signal can be received.

On the other hand, the digital sensor 1150 senses the door/window frame through a method that a mechanism touches the door/window frame, and the digital sensor 1150 is, for example, a limit switch or a proximity switch. A digital input 1138 can be a button input or an input of the digital sensor 1150. A digital output 1139 is electrically connected to a digital control unit 1152. The digital control unit 1152 is, for example, a light emitting diode (LED) lamp, a hydrovalve control unit or an air valve.

Moreover, the cleaner 1000 of the present embodiment further includes a level sensor 1143. The level sensor 1143 is electrically connected to the control system 1130, and senses a level angle of the cleaner 1000. The control system 1130 adjusts a moving path of the cleaner 1000 according to the level angle. The level angle is an important basis for planning a movement of the cleaner 1000, for example, moving straight forward or backward, and path planning of the cleaner 1000. In the present embodiment, the level sensor 1143 is, for example, any device capable of sensing the absolute level angle of the cleaner 1000, such as a gyroscope or a gradienter, etc.

Moreover, the cleaner 1000 of the present embodiment further includes a remote control receiver R1. The remote control receiver R1 receives a remote control signal Sw from a remote control transmitter R2, so that the control system 1130 can control the moving path of the cleaner 1000 according to the remote control signal Sw. A signal transmission method between the remote receiver R1 and the remote transmitter R2 is, for example, infrared transmission or wireless transmission, wherein the wireless transmission is, for example, ZigBee, bluetooth, RFIO, Wi-Fi, etc.

The remote control function of the cleaner 1000 may include functions such as system reset, automatic return, complete start, in-situ start and manual mode. The above functions are descried in detail below. The automatic return represents that the cleaner 1000 is automatically moved to a position where the operator can easily pick it up after the cleaning is completed, and the position is, for example, a middle-lower position of the plate 2000. The complete start represents that after the cleaner 1000 is moved to the top of the plate 2000, the cleaner 1000 start to perform the cleaning operation from left to right (or from right to left) and further from top to bottom. The in-situ start represents that started from a current position, the cleaner 1000 performs the cleaning operation from left to right (or from right to left) and further from top to bottom. The manual mode includes functions of controlling an in-situ cleaning of the cleaner 1000 or controlling up, down, left and right movement of the cleaner 1000.

Figure 4:
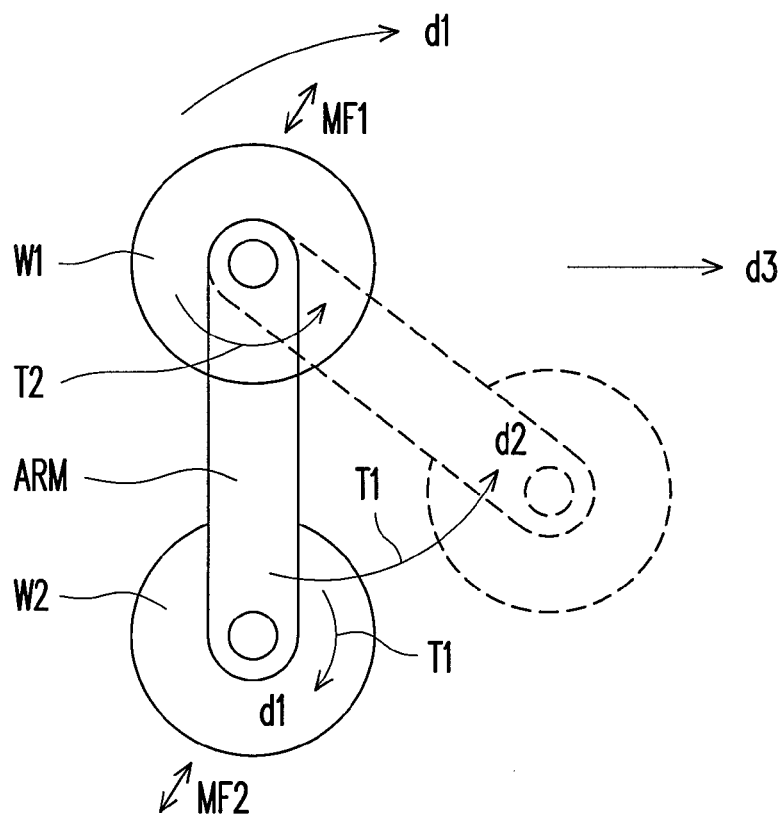
FIG. 4 is a schematic diagram illustrating a path control method of a cleaner.

FIG. 4 is a schematic diagram illustrating a path control method of a cleaner, in which the active cleaning wheels W1 and W2 are equivalent to the active cleaning wheels 1120 of FIG. 2. Referring to FIG. 2 and FIG. 4, when the active cleaning wheel W2 is to be moved, the active cleaning wheel W1 can be fixed still, and the active cleaning wheel W2 is rotated along a rotation direction d1, so that a torque force T1 is generated between the active cleaning wheel W2 and a connecting rod arm ARM. Then, the connecting rod arm ARM is swung along a rotation direction d2 opposite to the rotation direction d1 by the torque force T1. Besides, a torque force T2 can be exerted between the active cleaning wheel W1 and the connecting rod arm ARM.

For example, when the active cleaning wheel W2 is to be moved, a magnetic force MF2 of the first magnet 1122 in the active cleaning wheel W2 can be reduced, so as to facilitate a rotation of the active cleaning wheel W2. Meanwhile, a magnetic force MF1 in the active cleaning wheel W1 is increased, so as to increase a static friction between the active cleaning wheel W1 and the connecting rod arm ARM to increase an attraction force.

Then, the torque force T1 is exerted to the active cleaning wheel W2 for rotating the active cleaning wheel W2, wherein the torque force T1 on the active cleaning wheel W2 can be changed by adjusting the magnetic force MF2 in the active cleaning wheel W2. According to Newton's action and reaction principles, the connecting rod arm ARM now has a reaction force, and a magnitude of the reaction force is equivalent to the torque force T1. In this way, the connection rod arm ARM is swung along the rotation direction d2 opposite to the rotation direction d1 of the active cleaning wheel W2.

On the other hand, to increase or decrease a total torque force Tarm on the connecting rod arm ARM, a torque force T2 codirectional or reversed to the torque force T1 on the active cleaning wheel W2 can be exerted to the active cleaning wheel W1, though such torque force T2 is not enough to drive the first cleaning wheel W1 rotating by overcoming the static friction. Now, the total torque force Tarm on the connecting rod arm ARM is equal to T2+T1.

Moreover, regarding a method of controlling a rotation angle of the connecting rod arm ARM, the feedback of the level sensor 1143 of the cleaner 1000 can be used for positioning. After the desired rotation angle of the connecting rod arm ARM is reached, the torque forces T1 and T2 can be removed, and the magnetic forces MF1 and MF2 in the active cleaning wheels W1 and W2 are restored to normal magnetic forces.

Similarly, when the active cleaning wheel W1 is to be moved, the active cleaning wheel W2 can be fixed still, and the active cleaning wheel W1 is rotated along the rotation direction d2, so that a corresponding torque force is generated between the active cleaning wheel W1 and the connecting rod arm ARM. Then, the connecting rod arm ARM is swung along the rotation direction d1 opposite to the rotation direction d2 by the torque force, so that the cleaner 1000 can be moved along a direction d3. In the present embodiment, the rotation direction d1 is a clockwise direction, and the rotation direction d2 is an anticlockwise direction.

Deduced by analogy, by controlling a magnitude and direction of the torque force T2 on the active cleaning wheel W1, a magnitude of the magnetic force MF1, a magnitude and direction of the torque force T1 on the active cleaning wheel W2, and a magnitude of the magnetic force MF2, the cleaner 1000 can be moved forward or backward.

Figure 5:
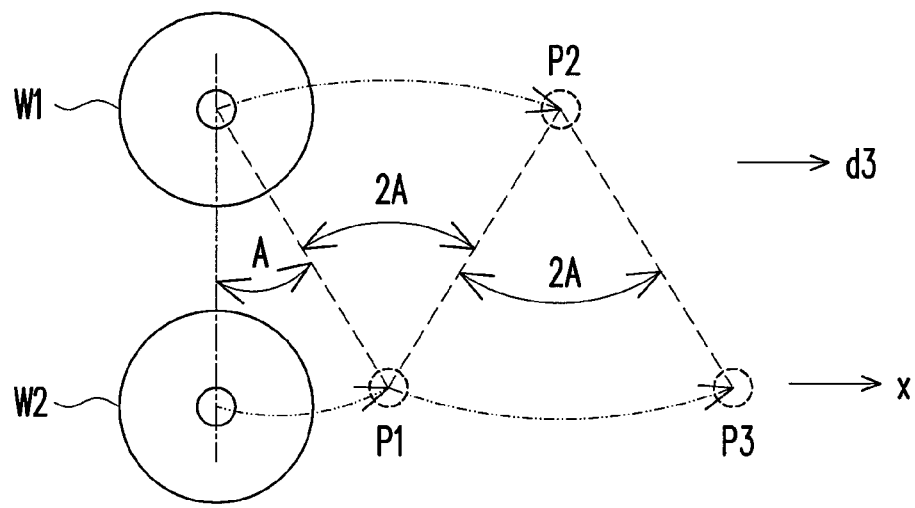
FIG. 5 is a schematic diagram illustrating a cleaner moved forward and backward relative to a direction d3.

FIG. 5 is a schematic diagram illustrating a cleaner moved forward and backward relative to a direction d3, wherein the direction d3 is for example, an x-axis. After the method of controlling the active cleaning wheels W1 and W2 to move forward and backward is introduced, a method of controlling the cleaner 1000 to move straight forward or backward along a fixed direction is described below. First, the active cleaning wheel W2 is swung to a position P1 according to the aforementioned method, wherein a swing angle thereof, is for example, A. Then, the active cleaning wheel W1 is swung to a position P2, wherein a swing angle thereof, is for example, 2A. Then, the active cleaning wheel W2 is swung to a position P3, wherein a swing angle thereof, is for example, 2A.

Finally, the last two steps are repeated, so that the cleaner 1000 can be moved straight forward along the direction d3. Moreover, by repeating the last two steps in a reversed sequence, the cleaner 1000 can be moved straight backward along the direction d3, i.e. the cleaner 1000 is moved straight forward along a direction reversed to the direction d3.

Figure 6:
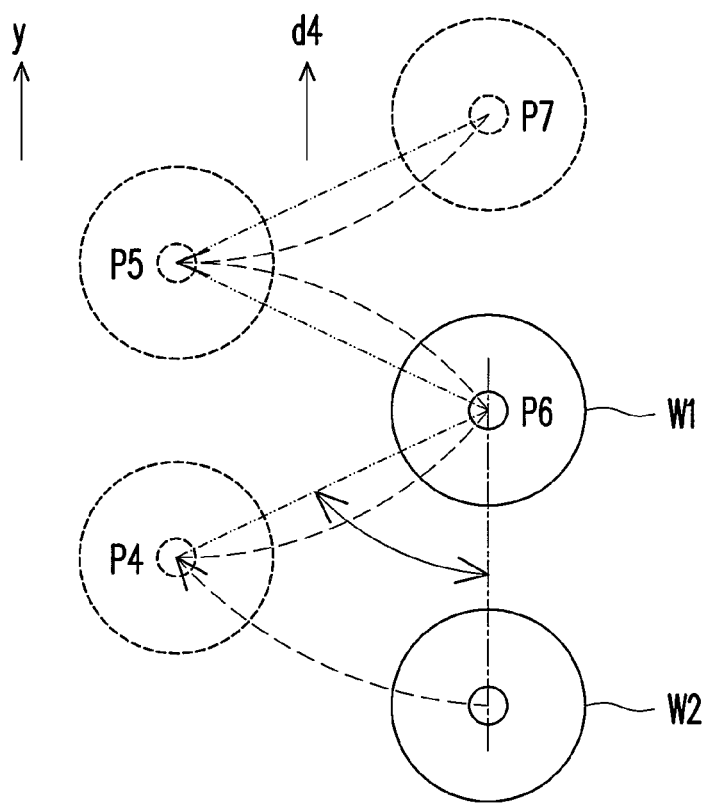
FIG. 6 is a schematic diagram illustrating a cleaner moved forward and backward relative to a direction d4.

FIG. 6 is a schematic diagram illustrating a cleaner moved forward and backward relative to a direction d4, wherein the direction d4 is perpendicular to the direction d3, and is, for example, a y-axis. A method of controlling the cleaner 1000 to move forward or backward along the fixed direction d4 includes following steps. First, the active cleaning wheel W2 is swung to a position P4. Then, the active cleaning wheel W1 is swung to a position P5. Then, the active cleaning wheel W2 is swung to a position P6. Then, the active cleaning wheel W1 is swung to a position P7. Finally, the above four steps are repeated, so that the cleaner 1000 can be moved straight forward along the direction d4. Moreover, by repeating the above four steps in a reversed sequence, the cleaner 1000 can be moved straight backward along the direction d4, i.e. the cleaner 1000 is moved straight forward along a direction reversed to the direction d4.

Figure 7:
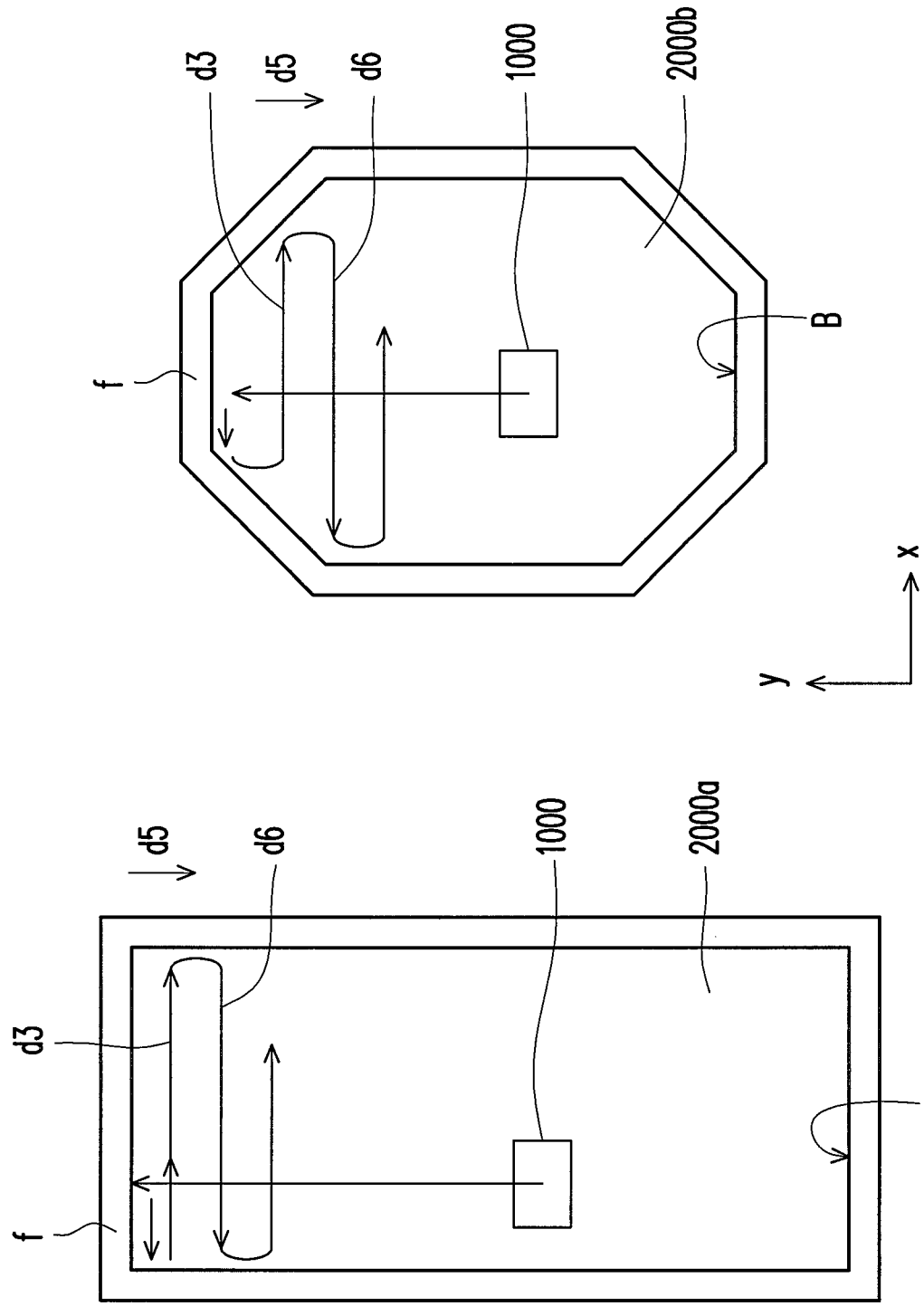
FIG. 7 is a schematic diagram illustrating a plan of a cleaning path of a cleaner 1000 on a door/window.

FIG. 7 is a schematic diagram illustrating a plan of a cleaning path of the cleaner 1000 on a door/window. Generally, a door/window 2000a or 2000b is usually disposed in upright, and a shape thereof is a rectangle (i.e. the door/window 2000a) or irregular (i.e. the door/window 2000b). As shown in FIG. 7, after the operator disposes the cleaner 1000 on the door/window 2000a or 2000b and starts the cleaner 1000, the cleaner 1000 is automatically moved upwards. When the edge sensor 1140 or 1150 in the cleaner 1000 senses a frame f, the cleaner 1000 starts to clean the door/window 2000a or 2000b from right to left (or left to right), and further from top to bottom until reaching the bottom of the door/window 2000a or 2000b, and further performs a final cleaning from right to left or from left to right. After the cleaning is completed, the cleaner 1000 can further send a warning sound to notify that the cleaning is completed.

As shown in FIG. 7, in detail, the moving path of the cleaner 1000 is, for example, sequentially along the directions d3, d5 and d6, wherein the direction d3 and the direction d6 are substantially parallel and reversed, and the direction d5 is substantially perpendicular to the directions d3 and d6. Moreover, in another embodiment, the moving path of the cleaner 1000 on the plate 2000 (for example, the door/window 2000a or 2000b) has a spiral shape, and the cleaner 1000 is moved from periphery of the plate 2000 to a center of the plate 2000.

Second Embodiment

Figure 8:
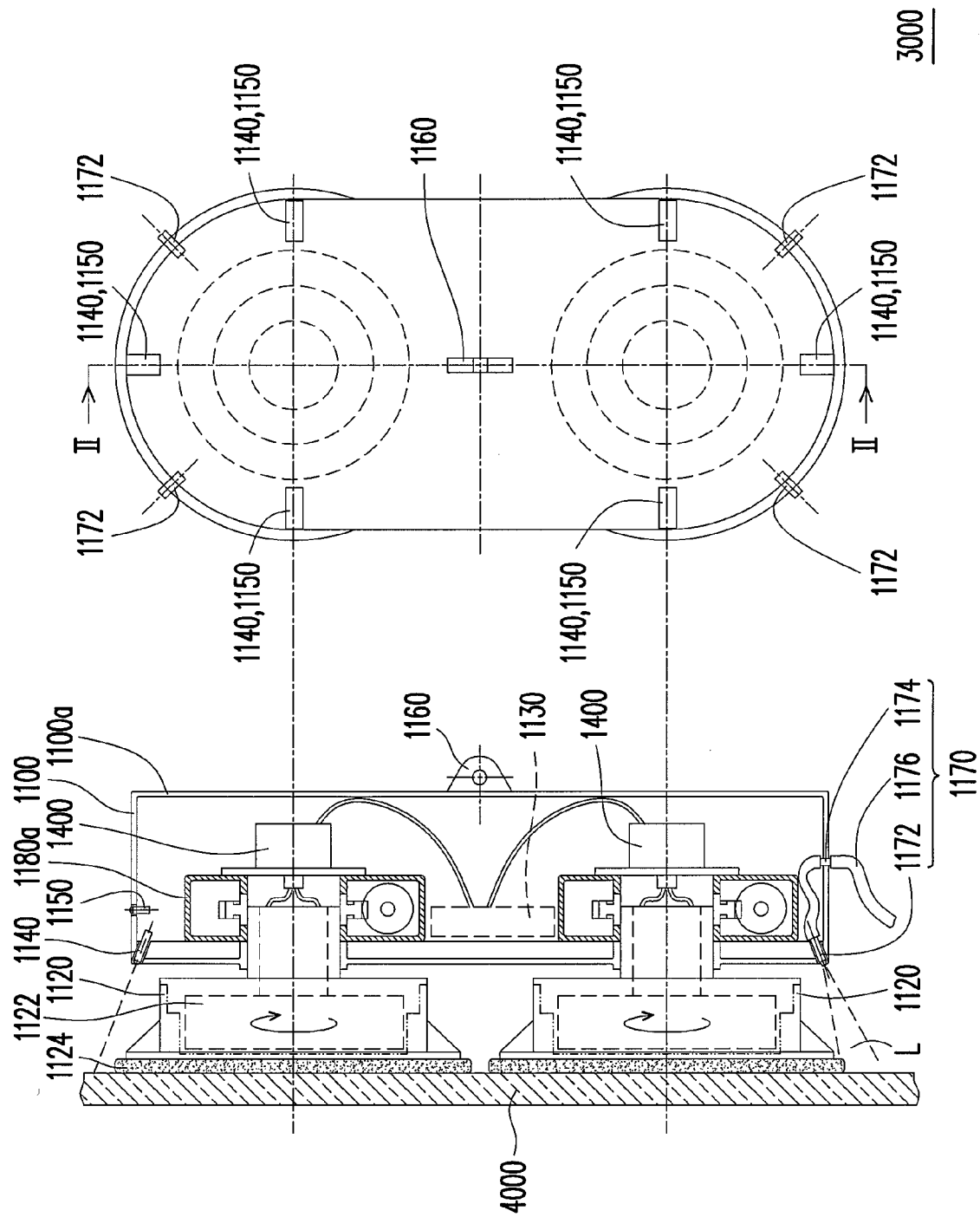
FIG. 8 is a schematic diagram illustrating a cleaner according to a second embodiment of the invention.

FIG. 8 is a schematic diagram illustrating a cleaner according to a second embodiment of the invention, in which a right diagram is a cross-sectional view of a left diagram along a section line II-II. The cleaner 3000 of the present embodiment is similar to the cleaner 1000 of the first embodiment, and a main difference therebetween is that the cleaner 300 is adapted to clean particles on a magnetic conductive plate 4000, and the cleaner 3000 does not use the slave driver 1200 of FIG. 1. The magnetic conductive plate 4000 is, for example, an iron plate, a large vessel or any other plate made of magnetic conductive material.

As shown in FIG. 8, the cleaner 3000 includes an active driver 1100 and a plurality of active cleaning wheels 1120. Each of the active cleaning wheels 1120 includes a first magnet 1122, wherein the active driver 1100 is directly attracted on the magnetic conductive plate 4000 through the first magnets 1122. Moreover, the first magnet 1122 may include a single magnetic pole or an even number of magnetic poles. The control system 1130 is electrically coupled to the active cleaning wheels 1120 for controlling a rotation of the active cleaning wheels 1120. A structure of the active driver 1100 is similar to that of the active driver 1100 in the first embodiment, and therefore detailed descriptions thereof are not repeated.

In summary, in the cleaner of the invention, the active driver and the slave driver are respectively attracted to two opposite sides of the plate by magnetic attraction between the active driver and the slave driver, so that both sides of the plate can be cleaned without assistance of manual labour. Moreover, in the cleaner of the invention, the active driver can be directly attracted to the magnetic conductive plate by the magnetic force, which also achieves an effect of cleaning the magnetic conductive plate.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A cleaner, adapted to clean particles on a plate, the cleaner comprising:
    an active driver, comprising:
        a plurality of active cleaning wheels, each of the active cleaning wheels comprising a first magnet, and the first magnet of each of the active cleaning wheels having an even number of magnetic poles; and
    a control system, electrically coupled to the active cleaning wheels, so as to control a rotation of the active cleaning wheels; and
    a slave driver, comprising a plurality of slave cleaning wheels, each of the slave cleaning wheels comprising a second magnet, and the second magnet of each of the slave cleaning wheels having an even number of magnetic poles, wherein the plate is disposed between the active driver and the slave driver, and the second magnets are disposed opposite to the first magnets, so that the active cleaning wheels drive the slave cleaning wheels to rotate by a magnetic force.

2. The cleaner as claimed in claim 1, further comprising:
    an active driver casing; and
    a safety lug, disposed on the active driver casing.

3. The cleaner as claimed in claim 1, further comprising:
    an active driver casing; and
    a water spray device, disposed on the active driver casing, wherein the water spray device includes a nozzle, a pipe fitting and an external pipe, and
    the external pipe is connected to the pipe fitting, and is further connected to the nozzle for spraying liquid to edges of the active cleaning wheels.

4. The cleaner as claimed in claim 1, further comprising:
    an active driver casing; and
    an edge sensor, disposed on the active driver casing, electrically connected to the control system, and sensing whether the cleaner is close to an edge of the plate.

5. The cleaner as claimed in claim 2, wherein the edge sensor is an infrared sensor, an ultrasonic sensor or a laser sensor.

6. The cleaner as claimed in claim 1, further comprising:
    an active driver casing; and
    a digital sensor, disposed on the active driver casing, electrically connected to the control system, and sensing whether the cleaner is close to a frame of the plate or a foreign matter.

7. The cleaner as claimed in claim 6, wherein the digital sensor is a limit switch or a proximity switch.

8. The cleaner as claimed in claim 1, wherein the control system comprises:
   a processing system, outputting a control signal; and
   a driving device, outputting a plurality of first driving signals according to the control signal, wherein the cleaner further comprises a plurality of cleaning motors correspondingly connected to the active cleaning wheels for respectively controlling the rotation of the active cleaning wheels according to the first driving signals, and wherein
   the driving device comprises:
   a pulse width modulation unit, outputting a plurality of first pulse width modulation signals according to the control signal; and
   a plurality of first driving units, correspondingly outputting the first driving signals according to the first pulse width modulation signals, so as to respectively control the rotation of the active cleaning wheels.

9. The cleaner as claimed in claim 8, wherein the pulse width modulation unit further outputs a plurality of second pulse width modulation signals according to the control signal, and the driving device further outputs a plurality of second driving signals according to the second pulse width modulation signals, and the cleaner further comprises a plurality of magnet motors connected to the first magnets, and the magnet motors respectively adjust magnetic forces of the first magnets exerted on the plate according to the second driving signals.

10. The cleaner as claimed in claim 9, further comprising a magnetic force sensor for sensing a magnitude of the magnetic force, and accordingly outputting a sensing signal to the control system, wherein the control system outputs the second driving signals according to the sensing signal.

11. The cleaner as claimed in claim 1, further comprising:
   a magnet motor speed reducer; and
   a screw rod, connected to the magnet motor speed reducer and at least one of the first magnets, and adjusting a position of at least one of the first magnets relative to the plate or changing a reluctance of at least one of the first magnets according to a magnitude of the magnetic force.

12. The cleaner as claimed in claim 1, wherein the first magnet is a fixed magnet.

13. The cleaner as claimed in claim 1, further comprising a conductive slip ring electrically connected to a power signal line in the active cleaning wheels.

14. The cleaner as claimed in claim 1, further comprising:
   a slave driver casing; and
   a safety lug, disposed on the slave driver casing.

15. The cleaner as claimed in claim 1, further comprising:
   a slave driver casing; and
   a water spray device, disposed on the slave driver casing, and adapted to spray liquid to edges of the slave cleaning wheels, wherein the water spray device includes a nozzle, a pipe fitting and an external pipe, and the external pipe is connected to the pipe fitting, and is further connected to the nozzle for spraying liquid to edges of the active cleaning wheels.

16. The cleaner as claimed in claim 1, wherein the second magnet is a fixed magnet.

17. The cleaner as claimed in claim 1, wherein the active cleaning wheels and the slave cleaning wheels each have a respective cleaning material.

18. The cleaner as claimed in claim 1, further comprising:
   a level sensor, sensing a level angle of the cleaner, wherein the control system adjusts a moving path of the cleaner according to the level angle.

19. The cleaner as claimed in claim 18, wherein the level sensor is a gyroscope or a gradienter.

20. The cleaner as claimed in claim 1, further comprising a remote control receiver for receiving a remote control signal, wherein the control system controls a moving path of the cleaner according to the remote control signal.

21. The cleaner as claimed in claim 20, wherein the remote control signal is sent by a remote control transmitter.

22. The cleaner as claimed in claim 1, wherein the plate is a non-magnetic conductive plate.

\* \* \* \* \*